(12) United States Patent
Uemura et al.

(10) Patent No.: US 8,760,497 B2
(45) Date of Patent: Jun. 24, 2014

(54) VIDEO SIGNAL PROCESSING DEVICE, DISPLAY DEVICE, DISPLAY METHOD AND PROGRAM PRODUCT

(75) Inventors: Yasuyuki Uemura, Kanagawa (JP); Nobutane Chiba, Kanagawa (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 13/077,108

(22) Filed: Mar. 31, 2011

(65) Prior Publication Data

US 2011/0249089 A1    Oct. 13, 2011

(30) Foreign Application Priority Data

Apr. 8, 2010  (JP) ................................. 2010-089602

(51) Int. Cl.
*H04N 13/00* (2006.01)
*H04N 13/04* (2006.01)

(52) U.S. Cl.
CPC .......... *H04N 13/00* (2013.01); *H04N 13/0497* (2013.01)
USPC .............................................. 348/43; 348/51

(58) Field of Classification Search
CPC ....................................................... H04N 9/73
USPC ............ 348/43, E13.073, 474, 495, 491, 138, 348/179, 222, 194, 388, 437, 438, 465, 348/500–550, 42, 51, 56, 57; 358/225
See application file for complete search history.

(56) References Cited

U.S. PATENT DOCUMENTS

| | | | | |
|---|---|---|---|---|
| 5,119,189 A | * | 6/1992 | Iwamoto et al. | 348/47 |
| 5,416,510 A | * | 5/1995 | Lipton et al. | 348/43 |
| 5,448,294 A | * | 9/1995 | Yamazaki | 348/230.1 |
| 5,748,199 A | * | 5/1998 | Palm | 345/473 |
| 6,236,428 B1 | * | 5/2001 | Fukushima | 348/42 |
| 2004/0145655 A1 | * | 7/2004 | Tomita | 348/51 |
| 2011/0096146 A1 | * | 4/2011 | Hulyalkar et al. | 348/43 |

FOREIGN PATENT DOCUMENTS

JP    3-191682    8/1991

* cited by examiner

*Primary Examiner* — Dave Czekaj
*Assistant Examiner* — Dramos I Kalapodas
(74) *Attorney, Agent, or Firm* — Oblon, Spivak, McClelland, Maier & Neustadt, L.L.P.

(57) ABSTRACT

A video processing device includes an input unit that receives a video signal for a left channel and a video signal for a right channel, a synchronization processing unit that performs a synchronization process used to correct mismatches between timings of the video signal for the left channel and the video signal for the right channel which are input to the input unit, a changing unit that changes video signal components of the video signal for the left channel and the video signal for the right channel which have undergone the synchronization process in the synchronization processing unit at an instructed timing and selects and outputs a synchronization signal component of either of the video signals, a control unit that performs setting for a video signal selected by the changing unit depending on an instructed mode, and an output unit that outputs the video signal selected by the changing unit.

8 Claims, 9 Drawing Sheets

VIDEO SIGNAL PROCESSING DEVICE, DISPLAY DEVICE, DISPLAY METHOD AND PROGRAM PRODUCT

BACKGROUND OF THE INVENTION

1. Field of the Invention

The present invention relates to a video signal processing device which processes a video signal for stereoscopic display, a display device which displays the processed video signal, a display method which is applied to a display process in the display device, and a program product which executes the display method.

2. Description of the Related Art

In the related art, in a case where video signals for a stereoscopic display (3D display) are supplied to and displayed on a display device such as a monitor display, video signals for a left channel and video signals for a right channel are supplied to the display device. Videos based on the video signals for the respective channels are separately viewed by the left and right eyes of a person viewing the display device.

For example, the person viewing the display device wears a glasses-type liquid crystal shutter device in which shutters for the right eye and the left eye are alternately opened and closed for each frame. Further, a video for the left channel and a video for the right channel are alternately displayed on the display device for each frame, and the shutters for the left and right eyes are alternately opened and closed for each frame, thereby recognizing the videos based on the video signals for the respective channels with the left and right eyes. On the other hand, there is a type of generating a stereoscopic vision by a process in a display device without wearing special glasses or the like. As display methods, there are various methods, in addition to the above-described method of changing videos for the left channel and videos for the right channel for each frame, for example, a method of changing videos for the left and right channels for each horizontal line.

In order to implement such a stereoscopic vision, it is necessary to use a dedicated display device for a 3D display; however, when capturing is performed using a camera device, there are many environments where the dedicated display device for a 3D display is not used. In this case, a video for a left channel and a video for a right channel are input to the display device, and the two input videos based on video signals are alternately changed, displayed and viewed.

FIG. 8 is a diagram illustrating a configuration of an image processing device 10 which alternately changes and supplies videos for two channels to a display device in the related art. In FIG. 8, an image processing device 10 and an image display device 20 are shown as a separate body, but may be formed as a single body. The image processing device 10 includes a first input terminal 11 and a second input terminal 12, and supplies video signals input to both the input terminals 11 and 12 to a video changing unit 13. The video changing unit 13 includes a switch, supplies a signal input to the first input terminal 11 to a first contact point 13a, supplies a signal input to the second input terminal 12 to a second contact point 13b, and selects a signal at either of the two contact points using a movable contact point 13m. The change in the switch is performed under the control of a CPU 14 which is a control unit.

The video signal selected by the video changing unit 13 is supplied to a video signal processing circuit 15 and a synchronization separating circuit 16. The video signal processing circuit 15 processes a video (image) part of the video signal so as to be appropriately displayed. The processed video signal is supplied to the image display device 20.

The synchronization separating circuit 16 separates synchronization signal components from the supplied video signal, and supplies the separated synchronization signal components to the image display device 20. The image display device 20 displays videos (images) in synchronization with the synchronization signal components.

The synchronization signals separated by the synchronization separating circuit 16 are supplied to a signal determination circuit 17 which determines synchronization timings and supplies the determined result to the CPU 14. The CPU 14 makes the video changing unit 13 change the video signals in synchronization with the determined timings.

Under the control of the CPU 14, when the video changing unit 13 changes a video signal to another type of video signal, in order to prevent the displayed videos from looking untidy during the change, a process called an image mute is temporarily performed. In the image mute process, for example, if a first video signal is assumed to be changed to a second video signal, a last frame of the first video signal is displayed, and thereafter an entirely black image is displayed during a period of one frame or several frames. After the entirely black image is displayed, a video based on the second video signal is displayed.

FIG. 9 is a diagram illustrating an outline of this display state. While the first input video is changed to the second input video, an entirely black image for the image mute is displayed during at least one frame period.

This image mute process is a generally performed technique during the change of channels, external inputs, or the like, even in a case of a display device such as, for example, a television set.

Japanese Unexamined Patent Application Publication No. 3-191682 discloses an example of the television set which performs the image mute process.

On the other hand, if the image mute process is performed during the general video change, in a display type where videos for left and right channels used to implement stereoscopic vision are alternately displayed using a single display device, the display of the videos for stereoscopic vision is hindered in some cases.

In other words, for example, in a case where a video for the left channel and a video for the right channel are alternately displayed on one screen, if the entirely black image for the image mute is displayed once every video change, the videos for the left and right channels may not be compared rapidly. Particularly, if videos for two channels are alternately changed at a relatively short cycle, a period when the entirely black image is displayed is lengthened, and thus the displayed videos appear very untidy.

SUMMARY OF THE INVENTION

It is desirable to use a typical display device for a 2D display and to satisfactorily confirm videos or the like used to implement stereoscopic vision.

According to an embodiment of the invention, there is performed a synchronization process for correcting mismatches between timings of an input video signal for a left channel and an input video signal for a right channel. There is performed a changing process where video signal components of the video signal for the left channel and the video signal for the right channel which have undergone the synchronization process at an instructed timing are changed, and a synchronization signal component of either of the video signals is selected and output. A video signal selected in the changing process is displayed in a display device.

In this way, it is possible to select and display a video signal for a necessary channel at a synchronized timing at a cycle of arbitrary frames or the like, with respect to video signals for left and right channels used to implement stereoscopic vision. The displayed videos undergo the synchronization process for the left and right channels and are based on signals of which synchronization signals are not changed, and thus the video change is possible without a process such as the image mute or the like necessary during a typical video change.

According to an embodiment of the invention, it is possible to display a video based on a desired video signal of an input video signal for a left channel and an input video signal for a right channel on a screen of a single display device by the setting of display modes to a desired changing state. Therefore, it is possible to simply and accurately compare the video for the left channel and the video for the right channel in a display device having no 3D display function.

DESCRIPTION OF THE PREFERRED EMBODIMENTS

Embodiments of the present invention will be described in the following order.

1. A whole configuration example according to an embodiment (FIG. 1)
2. A configuration example of a horizontal shift process according to an embodiment (FIG. 2)
3. Description of each display state (FIGS. 3 to 7B)

1. A Configuration Example According to an Embodiment

Hereinafter, a configuration example of a device according to this embodiment will be described with reference to FIG. 1.

A system in this embodiment is supplied with, a video signal for a left channel and a video signal for a right channel which are video signals used to implement stereoscopic vision, and processes the video signals. In other words, for example, images of a subject are captured by a camera device (not shown) for a left channel and a camera device (not shown) for a right channel, a video signal for a left channel and a video signal for a right channel are generated, and the system is supplied with the video signal for the left channel and the video signal for the right channel.

Figure 1:
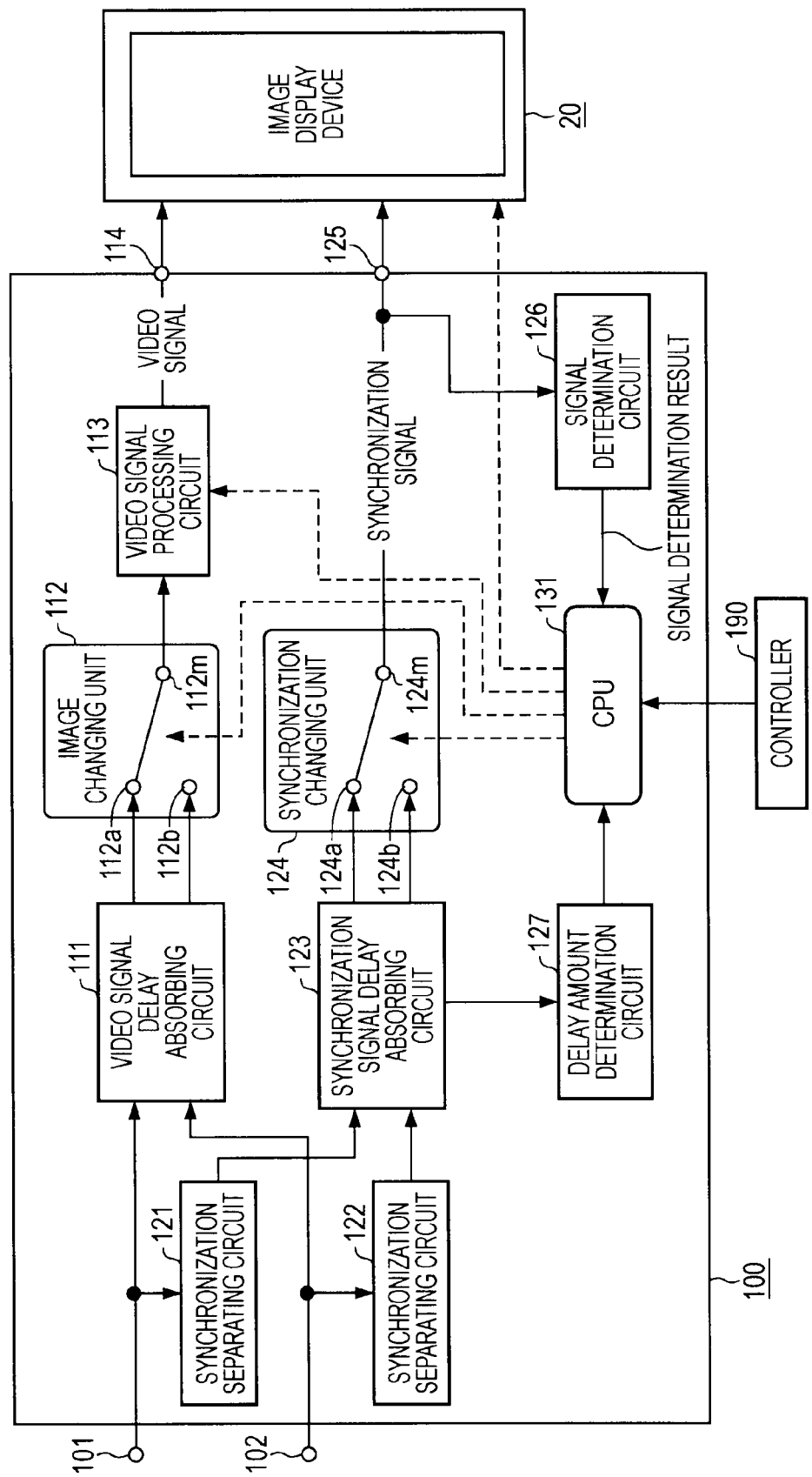
FIG. 1 is a block diagram illustrating an entire configuration example according to an embodiment of the present invention.

An image processing device 100 shown in FIG. 1 includes a first input terminal 101 and a second input terminal 102 which are input units of video signals, and a video signal for the left channel and a video signal for the right channel are input to the first input terminal 101 and the second input terminal 102. To the first input terminal 101 and the second input terminal 102, video signals output through the image capturing of the camera device for the left channel and the camera device for the right channel may be directly input, or video signals once recorded in a recording device of some sort may be input.

The video signal input to the first input terminal 101 and the video signal input to the second input terminal 102 are supplied to a video signal delay absorbing circuit 111, which performs a delay absorbing process for matching a timing of the respective video signal components. The video signal components in here refer to signals of video (image) component sections excluding synchronization signal sections from the input video signals.

A synchronization signal component of the video signal input to the first input terminal 101 is separated by a synchronization separating circuit 121, and a synchronization signal component of the video signal input to the second input terminal 102 is separated from the video signal by a synchronization separating circuit 122. The synchronization signal components refer to signals during a vertical blanking period and signals during a horizontal blanking period included in the video signal.

The synchronization signal components obtained by the respective synchronization separating circuits 121 and 122 are supplied to a synchronization signal delay absorbing circuit 123, which performs a delay absorbing process for matching timings of two synchronization signals.

The delay absorbing process in the video signal delay absorbing circuit 111 and the delay absorbing process in the synchronization signal delay absorbing circuit 123 are performed in synchronization with each other. Details of the delay absorbing process will be described later.

The video signal for the left channel and the video signal for the right channel of which the timings are matched by the video signal delay absorbing circuit 111 are supplied to fixed contact points 112a and 112b of one side and the other side of a switch in an image changing unit 112. A video signal obtained by a movable contact point 112m of the switch in the image changing unit 112 is supplied to a next video signal processing circuit 113, and a video signal processed by the video signal processing circuit 113 is supplied to a video output terminal 114 which is an output unit.

The synchronization signal for the left channel and the synchronization signal for the right channel of which the timings are matched by the synchronization signal delay absorbing circuit 123 are supplied to fixed contact points 124a and 124b of one side and the other side of a switch in a synchronization signal changing unit 124. A synchronization signal obtained by a movable contact point 124m of the switch in the synchronization signal changing unit 124 is supplied to a synchronization signal output terminal 125 which is an output unit.

The image changing unit 112 and the synchronization signal changing unit 124 perform the changes in synchronization with each other in response to instructions from a CPU 131 which is a control unit. In this case, the synchronization signals which have been processed by the synchronization signal delay absorbing circuit 123 are supplied to a delay amount determination circuit 127, and the delay amount determination circuit 127 determines timings of two synchronization signals and supplies timing data indicating whether or not the timings of two synchronization signals correspond with each other, to the CPU 131. If the CPU 131 determines that the timings are synchronized with each other from the timing data, the CPU 131 makes the image changing unit 112 perform the change of the video signals and the synchronization signal changing unit 124 select either of the synchronization signals. When the videos are changed in the state where the video signal is synchronized with the synchronization signal, the image changing unit 112 performs the change of the video signals, and the synchronization signal changing unit 124 continues to output either of the synchronization signals so as not to change the synchronization signals.

In this way, since only the video signals are changed after the timings of the video signals and the synchronization signals correspond with each other, that is, the video signals are changed without the change of the synchronization signals, a video display does not appear untidy, and thus the image mute is not necessary. Thereby, it is not necessary to insert a black image for the image mute described as the related art during the change.

The synchronization signal which the synchronization signal changing unit 124 selects and outputs is supplied to a signal determination circuit 126, and the CPU 131 also determines data indicating the determined result.

The CPU 131 receives commands from an external controller 190, and the changing state in the image changing unit 112 and the synchronization signal changing unit 124 is set based on the commands. Details of the changing state will be described later. The CPU 131 controls a display in an image display device 20 connected to the video signal processing circuit 113 and the image processing device 100.

The video signal processing circuit 113 to which the video signal changed by the image changing unit 112 is input performs a variety of video processes for a display. In a case where characters or figures indicating a type of each channel is inserted into a video in an overlapping manner, the video signal processing circuit 113 also performs the overlapping process.

Figure 2:
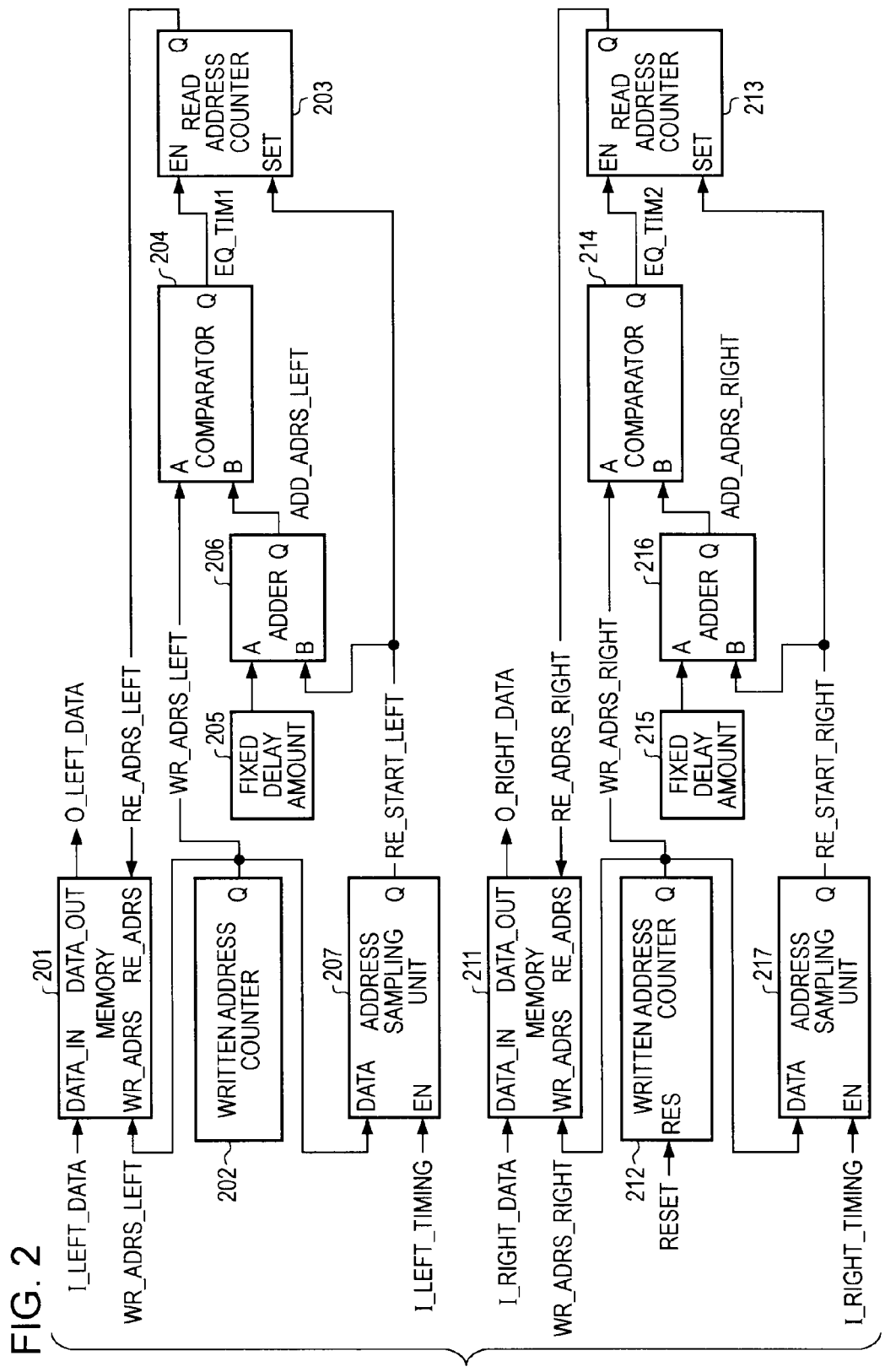
FIG. 2 is a block diagram illustrating a configuration example for a horizontal shift process according to an embodiment of the present invention.

2. A Configuration Example of a Horizontal Shift Process According to an Embodiment Processes performed in the video signal delay absorbing circuit 111 will be described in detail with reference to FIG. 2. FIG. 2 shows a configuration of processing delay absorption of a video signal, and this is also true of a configuration of processing delay absorption of a synchronization signal which is performed by the synchronization signal delay absorbing circuit 123. In FIG. 2, the upper part shows a configuration of processing a video signal for the left channel and the lower part shows a configuration of processing a video signal for the right channel.

The video signal delay absorbing circuit 111 has memories 201 and 211 which temporarily store video signals, and stores video signals input to the respective input terminals 101 and 102 using the memories 201 and 211. The memory 201 stores a video signal for the left channel and the memory 211 stores a video signal for the right channel.

The writing in the memories 201 and 211 is controlled by written addresses generated by written address counters 202 and 212. The reading from the memories 201 and 211 is controlled by read address counters 203 and 213.

Further, the video signal delay absorbing circuit 111 includes an address sampling unit 207 which samples an address output from the written address counter 202 and an address sampling unit 217 which samples an address output from the written address counter 211.

The output from the address sampling unit 207 and the output from a fixed delay setting circuit 205 are supplied to an adder 206 which supplies a signal indicating the resultant to a comparator 204. The written address output from the written address counter 202 is supplied to the comparator 204, and the comparator 204 makes a comparison between the signal and the written address. If a match between the two addresses is detected by the comparator 204, the comparator 204 supplies an enable signal to the read address counter 203.

The output from the address sampling unit 207 is supplied to the read address counter 203 as a read address control signal.

In the same manner, the output from the address sampling unit 217 and the output from a fixed delay setting circuit 215 are supplied to an adder 216 which supplies a signal indicating the resultant to a comparator 214. The written address output from the written address counter 212 is supplied to the comparator 214, and the comparator 214 makes a comparison between the signal and the written address. If a match between the two addresses is detected by the comparator 214, the comparator 214 supplies an enable signal to the read address counter 213.

The output from the address sampling unit 217 is supplied to the read address counter 213 as a read address control signal.

Figure 3:
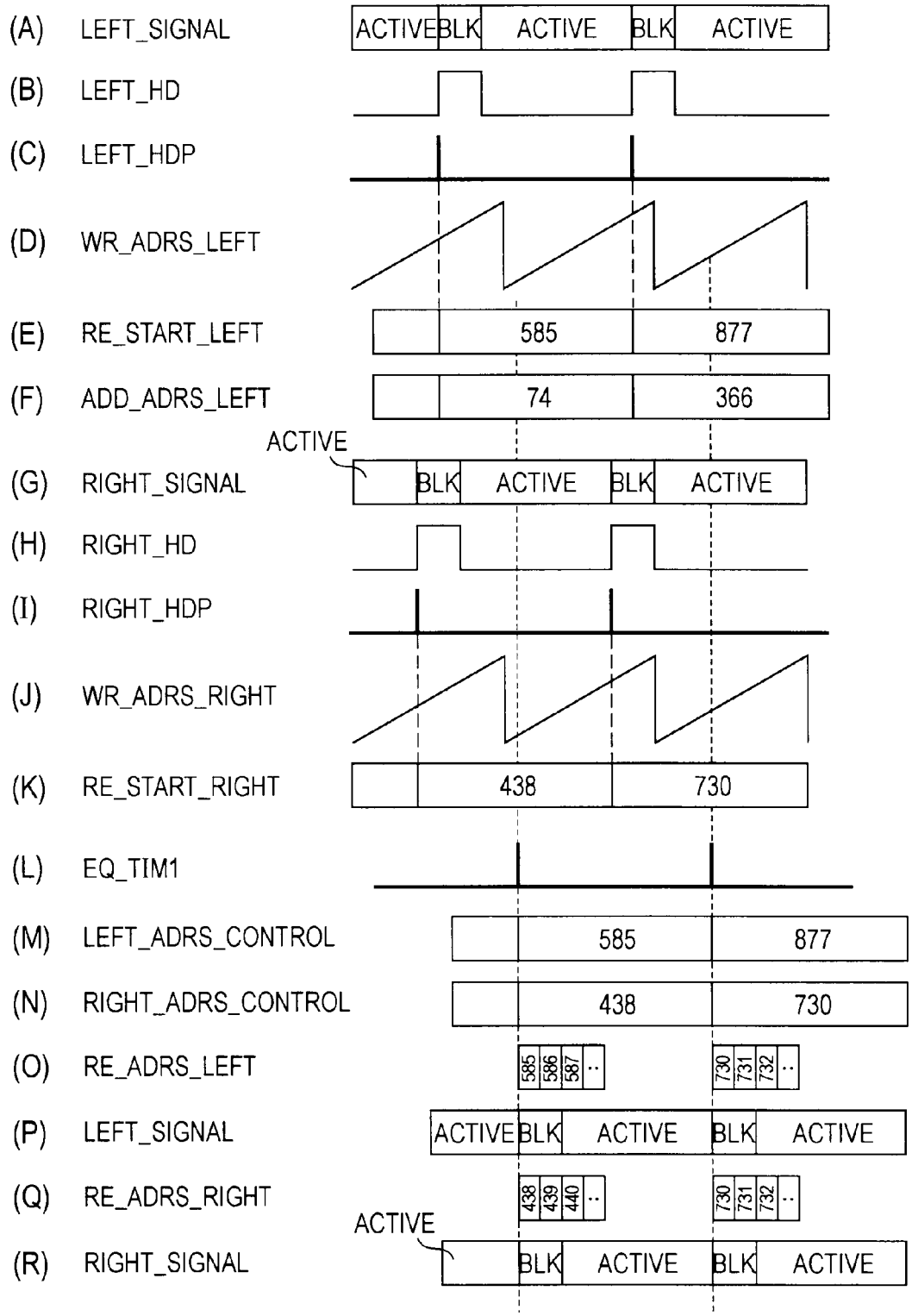
FIG. 3 is a timing diagram illustrating an operation example by the configuration shown in FIG. 2.

FIG. 3 is a timing diagram illustrating a state processed by the video signal delay absorbing circuit 111 shown in FIG. 2.

A in FIG. 3 shows an input video signal for the left channel and G in FIG. 3 shows an input video signal for the right channel. In these input video signals, a section denoted by "ACTIVE" indicates a video section, and a section denoted by "BLK" indicates a blanking period in which the synchronization signal components are disposed.

As shown in B and H in FIG. 3, respective horizontal synchronization signals are detected, and, as shown in C and I in FIG. 3, synchronization pulses indicating rising timings of the synchronization signals are generated.

The synchronization pulse in C in FIG. 3 is compared with a written address shown in D in FIG. 3, and thus an address sampling value can be obtained as shown in E in FIG. 3. The fixed delay amount set by the fixed delay setting circuit 215 is added to the sampling value, and thus an address value after the addition can be obtained as shown in F in FIG. 3. In the example in FIG. 3, a fixed value 512 is added.

Regarding the input video signal for the right channel shown in G in FIG. 3, the synchronization pulse in I in FIG. 3 is compared with a written address shown in J in FIG. 3, and thus an address sampling value can be obtained as shown in K in FIG. 3.

Further, as shown in L in FIG. 3, the pulse is generated at a timing when the written address is the same as the fixed value added address.

M in FIG. 3 shows an output value from the adder 208 for the left channel when the amount of variation in the phase from the CPU 131 is set to "0," and N in FIG. 3 shows an output value from the adder 218 for the right channel when the amount of variation in the phase from the CPU 131 is set to "0."

Also, an initial value is set to the output value from the adder 208 shown in M in FIG. 3, and, as shown in O in FIG. 3, the read address for the left channel begins to be counted from the pulse timing in L in FIG. 3. The video signal for the left channel is read from the memory 201 based on the read address, and thus the video signal for the left channel shown in P in FIG. 3 can be obtained.

In the same manner, an initial value is set to the output value from the adder 218 shown in N in FIG. 3, and, as shown in Q in FIG. 3, the read address for the right channel begins to be counted from the pulse timing in L in FIG. 3. The video signal for the right channel is read from the memory 211 based on the read address, and thus the video signal for the right channel shown in R in FIG. 3 can be obtained.

The video signal for the left channel shown in P in FIG. 3 and the video signal for the right channel shown in R in FIG. 3 exactly correspond with each other in the timing in the shift of the horizontal lines.

3. Description of Each Display State

Next, an example of video display states for left and right channels in the image display device 20, which is realized by the change by the image changing unit 112 of the image processing device 100 will be described.

Figure 4:
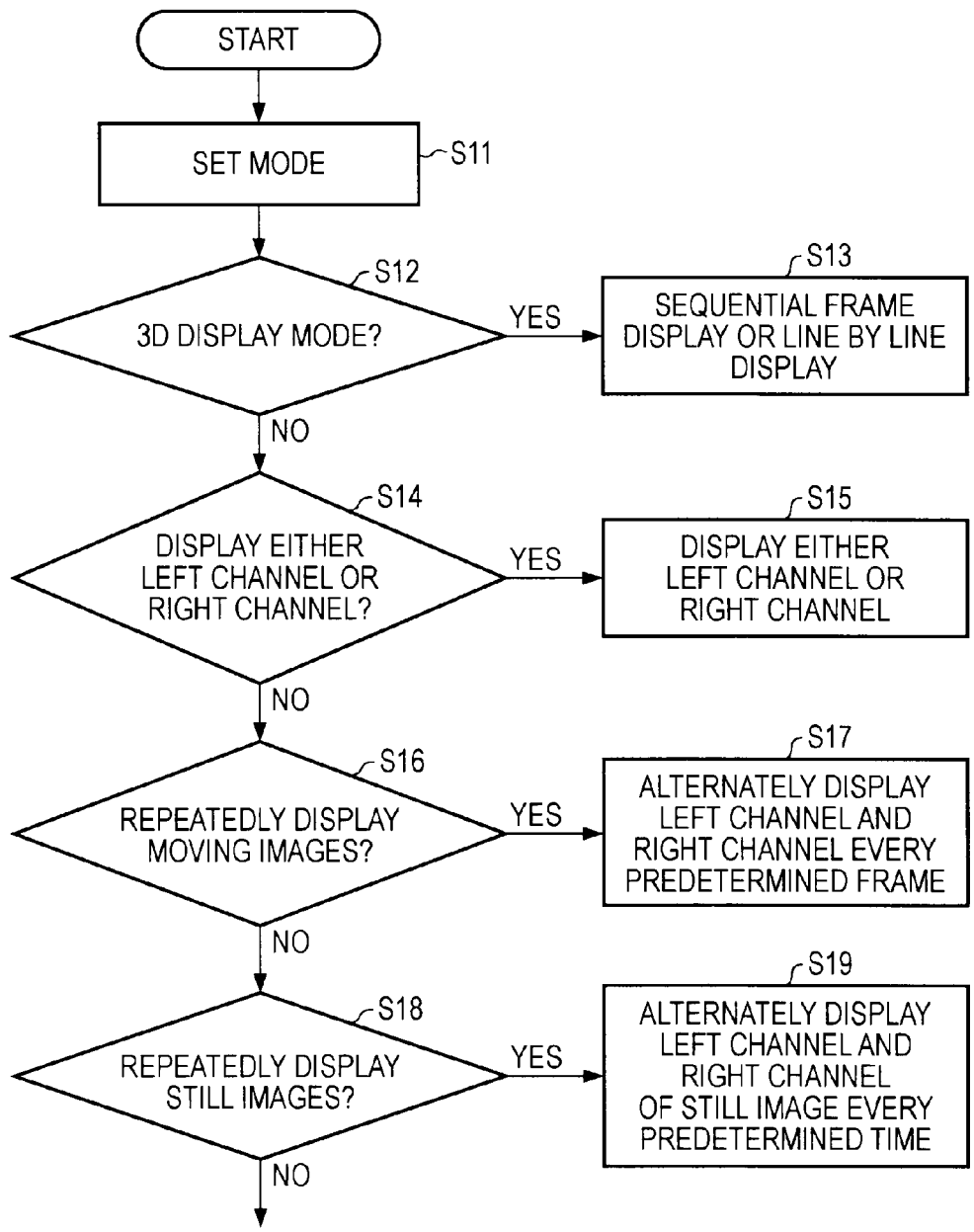
FIG. 4 is a flowchart illustrating a display mode setting example according to an embodiment of the present invention.

The flowchart in FIG. 4 shows an example of selecting display modes set by the CPU 131 based on instructions from the controller 190.

If the CPU 131 determines that a display mode is set (step S11), the CPU 131 determines whether or not the set display mode is a 3D display mode (step S12). When the set display mode is the 3D display mode for implementing stereoscopic vision in the display device, a video signal for the left channel and a video signal for the right channel are alternately displayed for each frame by the change in the image changing unit 112 and the synchronization signal changing unit 124 (step S13). The alternating display for each frame is an example of performing a stereoscopic display by a frame sequential method. In a case where the stereoscopic display is performed by a line-by-line method, the video signals for the left and right channels are changed for each horizontal line in the image changing unit 112 and the synchronization signal changing unit 124.

Figure 5A:
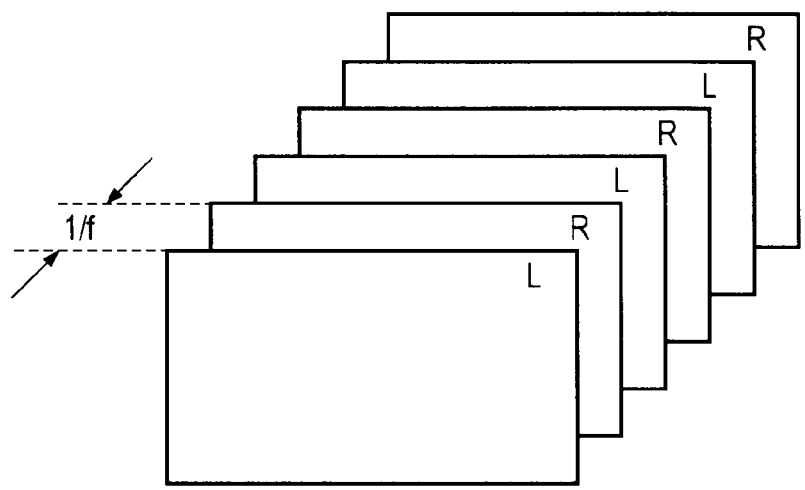
FIGS. 5A and 5B are diagrams illustrating an outline of processing a stereoscopic video display.
Figure 5B:
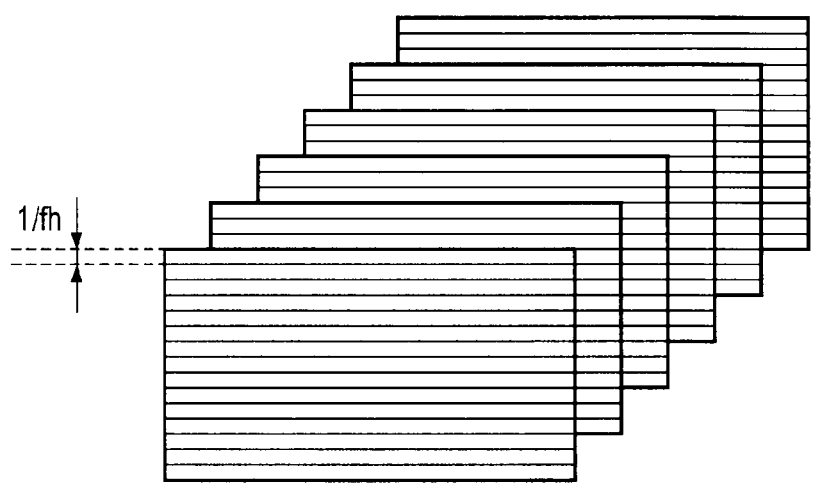

FIGS. 5A and 5B are diagrams illustrating an outline of a state of performing the stereoscopic display. FIG. 5A shows an example of performing the stereoscopic display by the frame sequential method. In this case, the videos for the left channel (videos marked with L) and the videos for the right channel (videos marked with R) are changed and displayed at a cycle of one frame. If the frame frequency is f, the changing cycle is 1/f.

FIG. 5B shows an example of performing the stereoscopic vision by the line-by-line method. In this case, if a frequency of the horizontal lines is fh, the videos for the left channel and the videos for the right channel are changed at a changing cycle of 1/fh for each horizontal line.

Referring to the flowchart in FIG. 4 again, if it is determined that the display mode is not the 3D display mode in step S12, it is determined whether the set display mode is a display mode for either the left channel or the right channel (step S14). Here, if it is determined that the set display mode is a display mode for either of the two channels, only videos for the instructed channel are selected and displayed in the image changing unit 112 and the synchronization signal changing unit 124 (step S15).

Figure 6A:
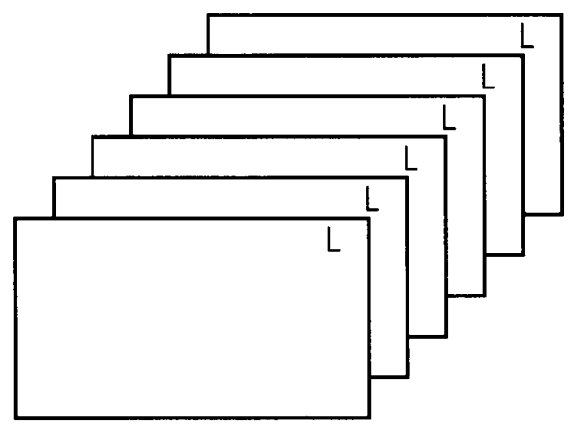
FIGS. 6A to 6C are diagrams illustrating display examples in respective modes according to an embodiment of the present invention.
Figure 6B:
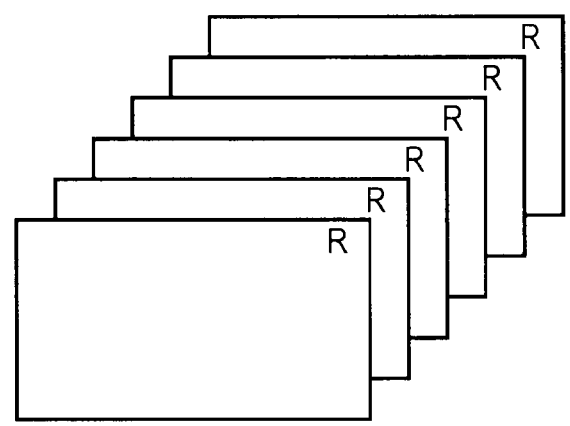

FIGS. 6A and 6B are diagrams illustrating an outline of a state of displaying only videos for either of the two channels. FIG. 6A shows an example of displaying only videos for the left channel. FIG. 6B shows an example of displaying only videos for the right channel.

Figure 6C:
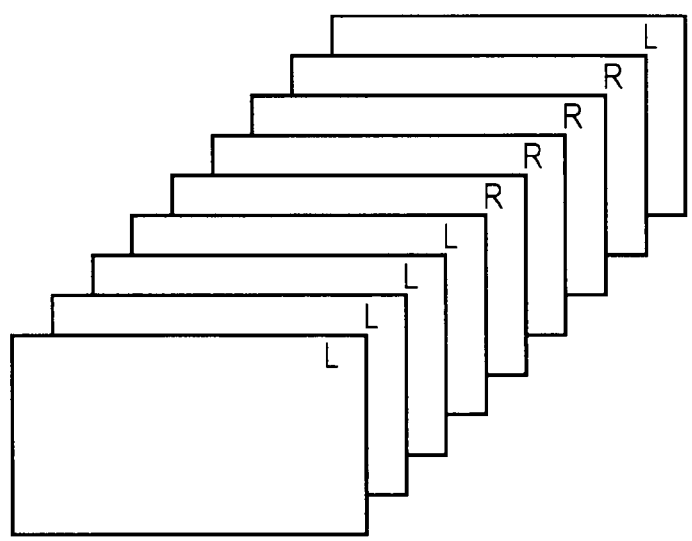

Further, in FIGS. 6A to 6C, the videos for the left channel are marked with "L" and the videos for the right channel are marked with "R" in order to indicate a channel type of videos which are being displayed, and when videos are actually displayed, marks for indicating the channel types may be displayed. That is to say, videos for the left channel are displayed with the character "L" and videos for the right channel are displayed with the character "R". In addition to the characters, marks indicating the channel types may be displayed using figures. The overlap of the characters or the figures is realized by, for example, the video signal processing circuit 113 under the control of the CPU 131 in the configuration shown in FIG. 1.

Referring to the flowchart in FIG. 4 again, if it is determined that the set display mode is not a display mode for either of the two channels in step S14, it is determined whether or not the set display mode is a repeated alternating display mode of moving images (step S16). Here, if it is determined that the set display mode is the moving picture repeated alternating display mode, moving images in a designated section are repeatedly and alternately displayed as videos for the left channel and the videos for the right channel (step S17).

FIG. 6C shows an example where videos for the left channel and videos for the right channel are repeatedly displayed in a designated section. In this example, the videos for each channel are displayed every four frames. Further, instead of repeatedly displaying videos in the same section, videos for the left and right channels may be alternately displayed during a predetermined frame period, and thereafter, videos in a section subsequent to that section may be repeatedly and alternately displayed.

In this example as well, in order to indicate the channel types of videos during the display, the videos for the left channel are marked with "L" and the videos for the right channel are marked with "R", and even in the actual display, marks indicating the channel types may be displayed.

Referring to the flowchart in FIG. 4 again, if it is determined that the set display mode is not a display mode of moving images in step S16, it is determined whether or not the set display mode is an alternating display mode of still images (step S18). Here, if it is determined that the set display mode is the alternating display mode of still images, a still image of a designated single frame is repeatedly and alternately displayed as videos for the left channel and videos for the right channel (step S19). At this time, for example, a still image for the left channel is consecutively displayed during a predetermined frame period, and then a still image for the right channel is consecutively displayed during a predetermined frame period.

In the case of this example as well, marks indicating the channel types, such as "L" and "R" and the like are preferably displayed.

Here, two examples of alternately displaying moving images in step S17 will be described with reference to FIGS. 7A and 7B.

Figure 7A:
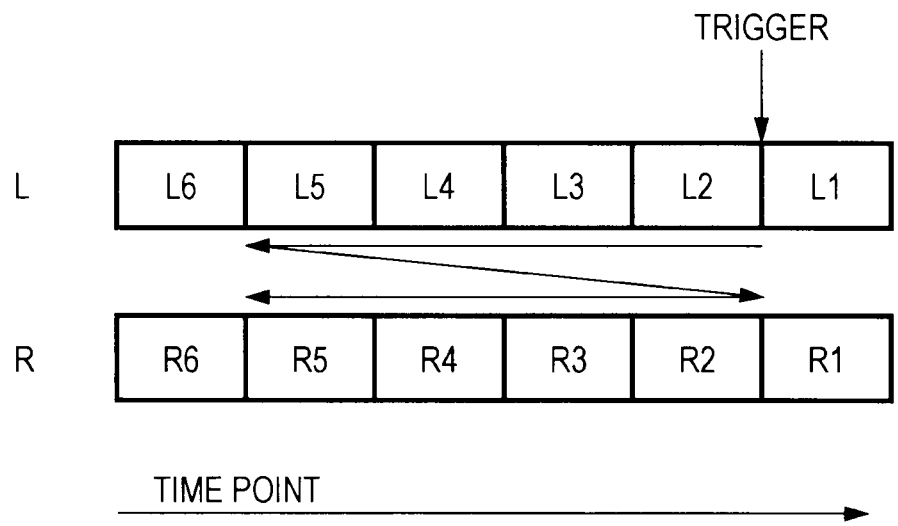
FIGS. 7A and 7B are diagrams illustrating examples of display variation in a moving picture (examples 1 and 2) according to an embodiment of the present invention.

In the example shown in FIG. 7A, for example, a display period is a period of four frames, and a trigger is made by a user's operation in a state where a video L2 for the left channel of a certain timing is displayed. At this time, a leading position of being repeatedly displayed is a frame L2, and the memory 201 shown in FIG. 2 stores video signals for the left channel of four frames from the frame L2 to the frame L5. At the same time, the memory 211 stores video signals of the right channel of four frames from the frame R2 to the frame R5.

The videos of the four frames for the left channel stored in the memory 201 and the videos of the four frames for the right channel stored in the memory 211 are repeatedly output, and the change of the videos is performed by the image changing unit 112 in synchronization with the output. In addition, the change of the synchronization signals in the synchronization signal changing unit 124 is also performed in synchronization with the output. At this time, the number of repetition times may be designated.

Figure 7B:
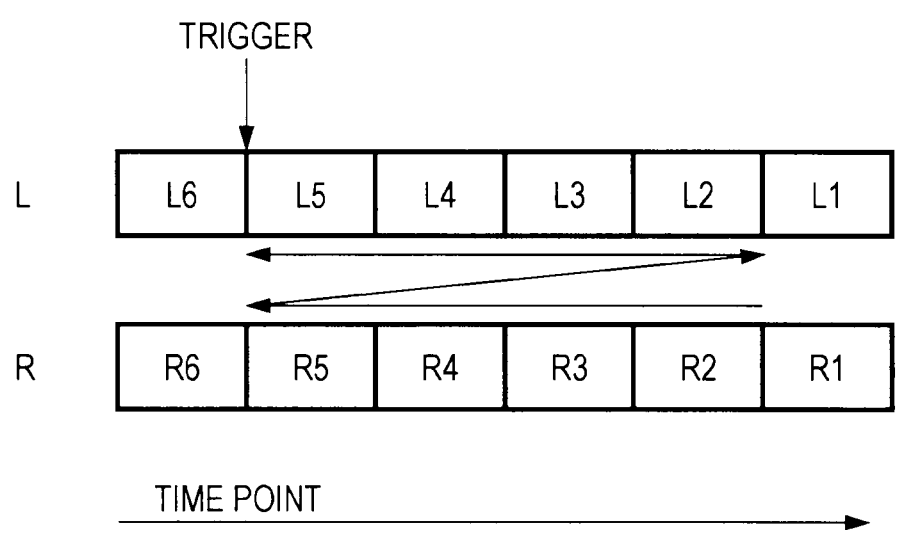
Figure 8:
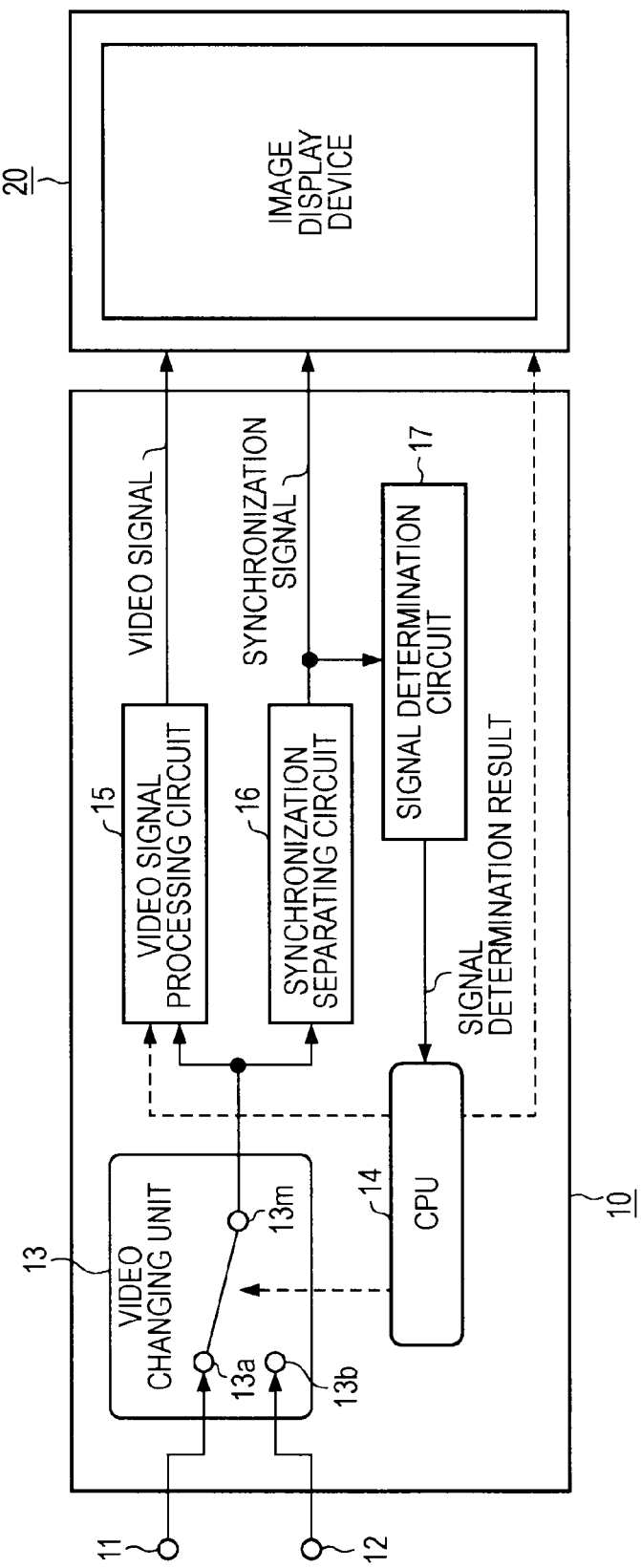
FIG. 8 is a block diagram illustrating a configuration example of video change processing in the related art.
Figure 9:
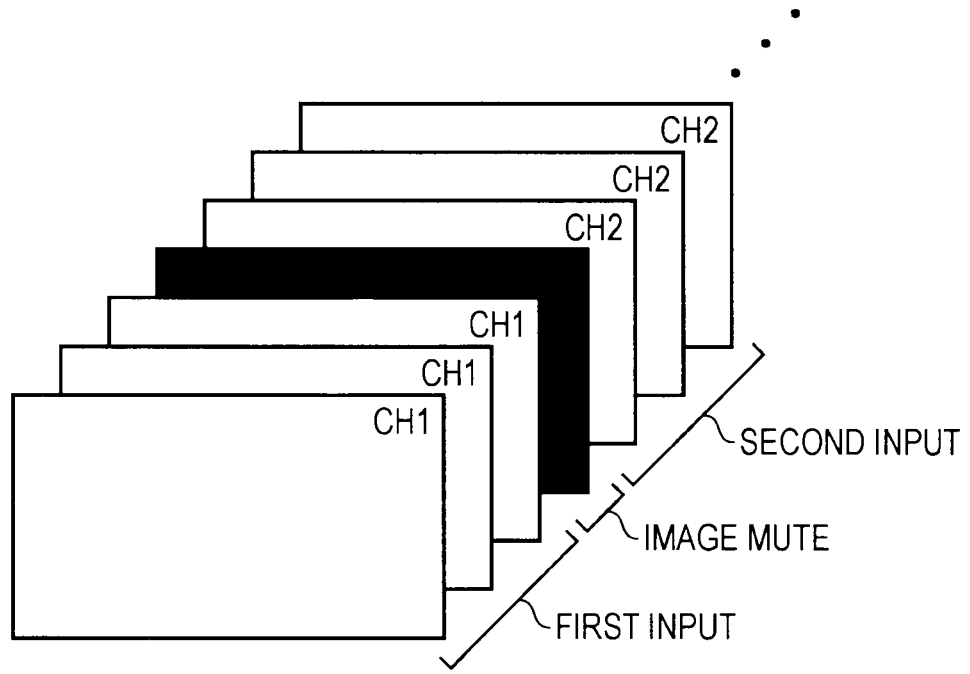
FIG. 9 is a diagram illustrating a display state when an image mute process is performed.

In the Example 2 shown in FIG. 7B, for example, a display period is a period of four frames, and a trigger is made by a user's operation in a state where a video R2 for the right channel of a certain timing is displayed. At this time, a leading position of being repeatedly displayed is a frame R2, and the memory 211 shown in FIG. 2 stores video signals for the right channel of four frames from the frame R2 to the frame R5. At the same time, the memory 201 stores video signals of the left channel of four frames from the frame L2 to the frame L5.

The videos of the four frames for the right channel stored in the memory 211 and the videos of the four frames for the left channel stored in the memory 201 are repeatedly output, and the change of the videos is performed by the image changing unit 112 in synchronization with the output. In addition, the change of the synchronization signals in the synchronization signal changing unit 124 is also performed in synchronization with the output.

In this way, the videos for the left and right channels are repeated for plural frames and alternately displayed on a screen of the same display device, and thereby the comparison between the videos for the left and right channels can be performed well. Particularly, when the left and right images are changed, since the image mute process is not performed, the video for the left channel and the video for the right channel are consecutively displayed without the insertion of the black image, and thus the comparison between the videos for both the channels can be performed well.

From the comparison, when timings or display positions regarding the left and right videos are mismatched or the like, it is possible to perform adjustment while the videos for both the channels are compared by the horizontal shift process using the configuration shown in FIG. 2. Also, although FIG. 2 shows the configuration for the horizontal shift process, a vertical shift process may be performed by the same process.

In the embodiment described hitherto, a dedicated circuit of processing video signals is not configured, but, for example, a computer device (information processing device) of processing various kinds of data is installed with a board, a card or the like which corresponds to the video processing unit in this embodiment and which performs a video process (an image process). Further, in a state where the board or the like is installed in the computer device, corresponding display processes may be performed using a program (software) executed by an operation processing unit.

The present application contains subject matter related to that disclosed in Japanese Priority Patent Application JP 2010-089602 filed in the Japan Patent Office on Apr. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video processing device comprising:
   circuitry configured to:
   receive a video signal for a left channel and a video signal for a right channel;
   perform a synchronization process used to correct mismatches between timings of the video signal for the left channel and the video signal for the right channel which are input;
   switch between video signal components of the video signal for the left channel and the video signal for the right channel which have undergone the synchronization process at an instructed timing;
   switch between synchronization signal components of the video signal for the left channel and the video signal for the right channel which have undergone the synchronization process;
   perform setting for a selected video signal component and a selected synchronization component depending on an instructed mode; and
   output the selected video signal component and the selected synchronization component.

2. The video processing device according to claim 1, wherein the circuitry is configured to alternately select the video signal component for the left channel and the video signal component for the right channel every predetermined plural frames.

3. The video processing device according to claim 2, wherein
   the video signal component for the left channel and the video signal component for the right channel which are alternately selected are video signals as moving images or still images output after storing video signals input in a memory, and
   the circuitry is configured to repeatedly output the video signals stored in the memory.

4. The video processing device according to claim 3, wherein the circuitry is configured to enable adjustment for output through a horizontal shift or a vertical shift of at least one of the video signals for the left channel and the video signal for the right channel.

5. The video processing device according to claim 1, wherein characters or figures indicating to which channel of the left channel and the right channel a video signal component belongs are added to the video signals output.

6. A display device comprising:
   circuitry configured to:
   receive a video signal for a left channel and a video signal for a right channel;
   perform a synchronization process used to correct mismatches between timings of the video signal for the left channel and the video signal for the right channel which are input;
   switch between video signal components of the video signal for the left channel and the video signal for the right channel which have undergone the synchronization process at an instructed timing;
   switch between synchronization signal components of the video signal for the left channel and the video signal for the right channel which have undergone the synchronization process;
   perform setting for a selected video signal component and selected synchronization component depending on an instructed mode; and
   display the selected video signal component.

7. A display method comprising the steps of:
   performing, via a processor, a synchronization process used to correct a mismatch between timings of an input video signal for a left channel and an input video signal for a right channel;
   switching, via the processor, between video signal components of the video signal for the left channel and the video signal for the right channel which have undergone the synchronization process at an instructed timing;

switching, via the processor, between synchronization signal components of the video signal for the left channel and the video signal for the right channel which have undergone the synchronization process; and displaying, via the processor, a selected video signal component.

8. A non-transitory program product which is installed in a computer device and which enables the computer device to execute the steps of:

performing a synchronization process used to correct mismatches between timings of an input video signal for a left channel and an input video signal for a right channel;

switching between video signal components of the video signal for the left channel and the video signal for the right channel which have undergone the synchronization process at an instructed timing;

switching between synchronization signal components of the video signal for the left channel and the video signal for the right channel which have undergone the synchronization process; and displaying a selected video signal component.

* * * * *